(12) United States Patent
Asai

(10) Patent No.: US 12,534,371 B2
(45) Date of Patent: *Jan. 27, 2026

(54) METHOD FOR PRODUCING SEMICONDUCTING SINGLE-WALLED CARBON NANOTUBE DISPERSION

(71) Applicant: Kao Corporation, Tokyo (JP)

(72) Inventor: Mitsuo Asai, Wakayama (JP)

(73) Assignee: KAO CORPORATION, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 18/285,430

(22) PCT Filed: Apr. 12, 2022

(86) PCT No.: PCT/JP2022/017585
§ 371 (c)(1),
(2) Date: Oct. 3, 2023

(87) PCT Pub. No.: WO2022/220239
PCT Pub. Date: Oct. 20, 2022

(65) Prior Publication Data
US 2024/0199426 A1    Jun. 20, 2024

(30) Foreign Application Priority Data
Apr. 12, 2021 (JP) ................. 2021-067326

(51) Int. Cl.
| | |
|---|---|
| *C01B 32/172* | (2017.01) |
| *C01B 32/159* | (2017.01) |
| *C01B 32/174* | (2017.01) |
| *C08F 220/06* | (2006.01) |
| *C08F 220/28* | (2006.01) |
| *C08K 3/04* | (2006.01) |
| *C09D 11/033* | (2014.01) |
| *C09D 11/037* | (2014.01) |
| *C09D 11/107* | (2014.01) |
| *C09D 11/52* | (2014.01) |
| *B82Y 30/00* | (2011.01) |
| *B82Y 40/00* | (2011.01) |

(52) U.S. Cl.
CPC .......... *C01B 32/172* (2017.08); *C01B 32/159* (2017.08); *C01B 32/174* (2017.08); *C08F 220/06* (2013.01); *C08F 220/281* (2020.02); *C08F 220/286* (2020.02); *C08K 3/041* (2017.05); *C09D 11/033* (2013.01); *C09D 11/037* (2013.01); *C09D 11/107* (2013.01); *C09D 11/52* (2013.01); *B82Y 30/00* (2013.01); *B82Y 40/00* (2013.01); *C01B 2202/02* (2013.01); *C01B 2202/22* (2013.01); *C01B 2202/36* (2013.01); *C08F 2800/10* (2013.01); *C08F 2800/20* (2013.01); *C08K 2201/001* (2013.01); *C08K 2201/003* (2013.01)

(58) Field of Classification Search
CPC ........................................ C08J 5/02
See application file for complete search history.

(56) References Cited

U.S. PATENT DOCUMENTS

| | | | | |
|---|---|---|---|---|
| 12,006,218 | B2* | 6/2024 | Hiraishi | ............... C01B 32/159 |
| 12,030,778 | B2* | 7/2024 | Asai | ...................... B82Y 30/00 |
| 2018/0099870 | A1 | 4/2018 | Gopalan et al. | |
| 2019/0218100 | A1 | 7/2019 | Li et al. | |
| 2021/0188642 | A1* | 6/2021 | Hiraishi | ............... C01B 32/174 |
| 2022/0388848 | A1 | 12/2022 | Asai et al. | |
| 2022/0402761 | A1 | 12/2022 | Hiraishi | |

FOREIGN PATENT DOCUMENTS

| | | | | |
|---|---|---|---|---|
| EP | 3 798 186 | A1 | 3/2021 | |
| IN | 202017053160 | A | 2/2021 | |
| JP | 2008-55375 | A | 3/2008 | |
| JP | 2010-64904 | A | 3/2010 | |
| JP | 2018-168018 | A | 11/2018 | |
| JP | 2019-525879 | A | 9/2019 | |
| JP | 2019-202912 | A | 11/2019 | |
| JP | 6900453 | B2 | 7/2021 | |
| JP | 7002517 | B2 | 1/2022 | |
| WO | WO 2019225651 | A1 * | 11/2019 | ............... B03B 5/28 |

OTHER PUBLICATIONS

International Search Report, issued in PCT/JP2022/017585, PCT/ISA/210, dated Jun. 21, 2022.
Extended European Search Report for European Application No. 22788164.6, dated Oct. 27, 2025.
Homenick et al., "High-Yield, Single-Step Separation of Metallic and Semiconducting SWCNTs Using Block Copolymers at Low Temperatures," The Journal of Physical Chemistry C, vol. 118, No. 29, Jul. 24, 2014, XP093090951, pp. 16156-16164.

(Continued)

*Primary Examiner* — Khanh T Nguyen
(74) *Attorney, Agent, or Firm* — Birch, Stewart, Kolasch & Birch, LLP

(57) ABSTRACT

An aspect of the present disclosure relates to a method for producing a semiconducting single-walled carbon nanotube dispersion that includes a step of centrifuging a separation target SWCNT dispersion containing SWCNTs that include semiconducting SWCNTs and metallic SWCNTs, an aqueous medium, and a polymer, and then collecting a supernatant liquid containing the semiconducting SWCNTs. The polymer is a copolymer that includes a structural unit A derived from a monomer represented by Formula (1) below and a structural unit B derived from a monomer represented by Formula (3) below.

$$CH_2=CR^0-COOM \qquad (1)$$

$$CH_2=CR^5-COO\text{-}(EO)_p-(PO)_q-R^6 \qquad (3)$$

20 Claims, No Drawings

(56) References Cited

OTHER PUBLICATIONS

Iborra et al., "Copolymer based on lauryl methacrylate and poly (ethylene glycol) methyl ether methacrylate as amphiphilic macrosurfactant: Synthesis, characterization and their application as dispersing agent for carbon nanotubes," European Polymer Journal, vol. 87, Feb. 1, 2017, XP093324865, pp. 308-317.

* cited by examiner

METHOD FOR PRODUCING SEMICONDUCTING SINGLE-WALLED CARBON NANOTUBE DISPERSION

TECHNICAL FIELD

The present disclosure relates to a method for producing a semiconducting single-walled carbon nanotube dispersion, a method for producing a semiconducting single-walled carbon nanotube that includes this dispersion production method as one step, a method for separating a metallic single-walled carbon nanotube and a semiconducting single-walled carbon nanotube, and the like.

BACKGROUND ART

In recent years, nanometer-sized carbon materials are expected to be applied to various fields due to their physical properties and chemical properties. One such material is carbon nanotubes (which may be referred to as "CNTs" hereinafter). CNTs have a structure in which a graphene sheet is rounded in a cylindrical shape, and CNTs in which the cylinder consists of only one layer are called single-walled carbon nanotubes (which may be referred to as "SWCNTs" hereinafter).

It is known that CNTs have different electrical properties and the like depending on the winding manner, diameter, and the like of graphene sheets. Particularly because SWCNTs are greatly affected by the quantum effect, some SWCNTs are metallic (metallic SWCNTs) and the others are semiconducting (semiconducting SWCNTs). As methods for producing an SWCNT, synthetic methods such as a high pressure carbon monoxide disproportionation method (HiPco method), an improved direct jet pyrolysis synthesis method (e-DIPS method), an arc-discharge method, and a laser ablation method are known, but at present, a technique for producing only one type of CNT has not been established, and therefore, when an SWCNT is applied to various applications, it is necessary to separate a target type of SWCNT from a mixture of SWCNTs. Metallic SWCNTs are expected to utilize their excellent conductivity for transparent electrodes for touch panels and solar cells, utilization for fine wiring of devices, etc., and semiconducting SWCNTs are expected to be applied to transistors and sensors, etc.

Several methods for separating a metallic SWCNT and a semiconducting SWCNT have already been reported. JP 2019-202912A (Patent Document 1) discloses a separation method in which a metallic SWCNT and a semiconducting SWCNT in a separation target SWCNT dispersion are separated with a simple operation by using a specific copolymer as a separating agent. Specifically, Patent Document 1 discloses a method for producing a semiconducting SWCNT dispersion that includes a step in which a separation target SWCNT dispersion containing polyacrylic acid as a dispersant is centrifuged, and then a supernatant liquid containing semiconducting SWCNTs is collected from the centrifuged dispersion.

DISCLOSURE OF INVENTION

An aspect of the present disclosure relates to
a method for producing a semiconducting SWCNT dispersion, including:
a step of preparing a separation target SWCNT dispersion containing SWCNTs that include semiconducting SWCNTs and metallic SWCNTs, an aqueous medium, and a polymer; and
a step of centrifuging the separation target SWCNT dispersion, and then collecting a supernatant liquid containing the semiconducting SWCNTs from the centrifuged separation target SWCNT dispersion,
wherein the polymer is a copolymer that includes a structural unit A derived from a monomer represented by Formula (1) below and a structural unit B derived from a monomer represented by Formula (3) below.

$$CH_2=CR^0-COOM \qquad (1)$$

In Formula (1), $R^0$ represents a hydrogen atom or a methyl group. M represents one of a hydrogen atom, a metallic atom, and a group having a structure represented by Formula (2) below.

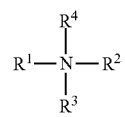

$$\qquad (2)$$

In Formula (2), $R^1$, $R^2$, $R^3$, and $R^4$ independently represent a hydrogen atom or an alkyl group having 1 or 2 carbon atoms that optionally has a hydroxyl group.

$$CH_2=CR^5-COO-(EO)_p-(PO)_q-R^6 \qquad (3)$$

In Formula (3), $R^5$ represents a hydrogen atom or a methyl group. $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

An aspect of the present disclosure relates to a method for producing a semiconducting SWCNT, including a step of collecting a semiconducting SWCNT by filtering a semiconducting SWCNT dispersion obtained using the method for producing a semiconducting SWCNT dispersion according to the present disclosure.

An aspect of the present disclosure relates to a method for producing a semiconducting SWCNT, including: a step of obtaining a mixture containing a semiconducting SWCNT and the copolymer by drying a semiconducting SWCNT dispersion obtained using the method for producing a semiconducting SWCNT dispersion according to the present disclosure; and a step of collecting a semiconducting SWCNT by removing the copolymer from the mixture.

An aspect of the present disclosure relates to
a method for separating a semiconducting SWCNT and a metallic SWCNT, including:
a step of preparing a separation target SWCNT dispersion containing SWCNTs that include semiconducting SWCNTs and metallic SWCNTs, an aqueous medium, and a polymer; and
a step of centrifuging the separation target SWCNT dispersion, and then collecting a supernatant liquid containing the semiconducting SWCNTs from the centrifuged separation target SWCNT dispersion,
wherein the polymer is a copolymer that includes a structural unit A derived from a monomer represented by Formula (1) below and a structural unit B derived from a monomer represented by Formula (3) below.

$$CH_2=CR^0-COOM \qquad (1)$$

In Formula (1), $R^0$ represents a hydrogen atom or a methyl group. M represents one of a hydrogen atom, a metallic atom, and a group having a structure represented by Formula (2) below.

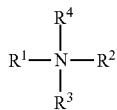  (2)

In Formula (2), $R^1$, $R^2$, $R^3$, and $R^4$ independently represent a hydrogen atom or an alkyl group having 1 or 2 carbon atoms that optionally has a hydroxyl group.

$$CH_2=CR^5-COO-(EO)_p-(PO)_q-R^6 \quad (3)$$

In Formula (3), $R^5$ represents a hydrogen atom or a methyl group. $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

An aspect of the present disclosure relates to a method for producing semiconducting SWCNT-containing ink, including, as one step, the method for producing a semiconducting SWCNT dispersion according to the present disclosure or the method for producing a semiconducting SWCNT according to the present disclosure.

An aspect of the present disclosure relates to semiconducting SWCNT-containing ink including semiconducting SWCNTs, at least one of an organic solvent and water, and a copolymer that includes a structural unit A derived from a monomer represented by Formula (1) below and a structural unit B derived from a monomer represented by Formula (3) below.

$$CH_2=CR^0-COOM \quad (1)$$

In Formula (1), $R^0$ represents a hydrogen atom or a methyl group. M represents one of a hydrogen atom, a metallic atom, and a group having a structure represented by Formula (2) below.

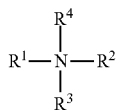  (2)

In Formula (2), $R^1$, $R^2$, $R^3$, and $R^4$ independently represent a hydrogen atom or an alkyl group having 1 or 2 carbon atoms that optionally has a hydroxyl group.

$$CH_2=CR^5-COO-(EO)_p-(PO)_q-R^6 \quad (3)$$

In Formula (3), $R^5$ represents a hydrogen atom or a methyl group. $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

DESCRIPTION OF INVENTION

It is desired that the semiconducting SWCNT separability is high, and the obtained semiconducting SWCNT dispersion has favorable dispersion stability.

An aspect of the present disclosure relates to a method for producing a semiconducting SWCNT dispersion and a method for separating a semiconducting SWCNT and a metallic SWCNT that is capable of achieving both high semiconducting SWCNT separability and dispersion stability of the obtained semiconducting SWCNT dispersion. Also, an aspect of the present disclosure relates to a method for producing a semiconducting SWCNT and a method for producing semiconducting SWCNT-containing ink that includes the above-mentioned production method as one step. Furthermore, an aspect of the present disclosure relates to semiconducting SWCNT-containing ink.

The present disclosure is based on the finding that, due to a specific polymer being contained in a separation target SWCNT dispersion, both high semiconducting SWCNT separability and the dispersion stability of the semiconducting SWCNTs in the obtained semiconducting SWCNT dispersion are favorably achieved.

The mechanism by which the effects of the present disclosure are exhibited is presumed as follows, although the details of the mechanism have not been clarified. In the present disclosure, the separation target SWCNT dispersion contains a copolymer that includes the structural unit A derived from the monomer represented by Formula (1) above, and therefore, the semiconducting SWCNTs are selectively dispersed in the dispersion, whereas the metallic SWCNTs coagulate. Thus, it is presumed that centrifuging this separation target SWCNT dispersion makes it possible to favorably separate the metallic SWCNT and the semiconducting SWCNT and improve the semiconducting SWCNT separability. Also, it is presumed that, since the copolymer includes the structural unit B derived from the monomer represented by Formula (3) above, the dispersion stability of the semiconducting SWCNT in the obtained semiconducting SWCNT dispersion is favorable. However, the present disclosure is not construed as being limited to the above-described mechanism.

The present disclosure can provide a method for producing a semiconducting SWCNT dispersion and a method for separating a semiconducting SWCNT and a metallic SWCNT that is capable of achieving both high semiconducting SWCNT separability and dispersion stability of the obtained semiconducting SWCNT dispersion. Also, an aspect of the present disclosure can provide a method for producing a semiconducting SWCNT and a method for producing semiconducting SWCNT-containing ink that includes the above-mentioned production method as one step, and can further provide semiconducting SWCNT-containing ink.

Method for Producing Semiconducting SWCNT Dispersion, Method for Separating Semiconducting SWCNT and Metallic SWCNT An aspect of the present disclosure relates to a method for producing a semiconducting SWCNT dispersion (also referred to as "a dispersion production method of the present disclosure" hereinafter) that includes a step A and a step B below. Also, another aspect of the present disclosure relates to a method for separating a semiconducting SWCNT and a metallic SWCNT (also referred to as "a separation method of the present disclosure" hereinafter) that includes a step A and a step B below.

(Step A) A separation target SWCNT dispersion containing SWCNTs (also referred to as "an SWCNT mixture" hereinafter) that include semiconducting SWCNTs and metallic SWCNTs, a copolymer that includes a structural unit A derived from a monomer (also referred to as "a monomer A" hereinafter) represented by Formula (1) below and a structural unit B derived from a monomer (also referred to as "a monomer B" hereinafter) represented by Formula (3) below, and an aqueous medium is prepared.

(Step B) The separation target SWCNT dispersion is centrifuged, and then a supernatant liquid containing the semiconducting SWCNTs is collected from the centrifuged separation target SWCNT dispersion.

$$CH_2=CR^0-COOM \qquad (1)$$

In Formula (1), $R^0$ represents a hydrogen atom or a methyl group. M represents one of a hydrogen atom, a metallic atom, and a group having a structure represented by Formula (2) below.

$$(2)$$
$$R^1-\underset{\underset{R^3}{|}}{\overset{\overset{R^4}{|}}{N}}-R^2$$

In Formula (2), $R^1$, $R^2$, $R^3$, and $R^4$ independently represent a hydrogen atom or an alkyl group having 1 or 2 carbon atoms that optionally has a hydroxyl group.

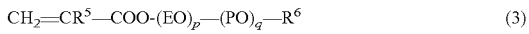

$$CH_2=CR^5-COO\text{-}(EO)_p-(PO)_q-R^6 \qquad (3)$$

In Formula (3), $R^5$ represents a hydrogen atom or a methyl group. $R^6$ represents a hydrogen atom or a hydrocarbon group having 1 to 5 carbon atoms, EO represents an ethyleneoxy group (also referred to as "an EO group" hereinafter), PO represents a propyleneoxy group (also referred to as "a PO group" hereinafter), p represents the average number of moles of the ethyleneoxy groups added and is 1 or more and 120 or less, and q represents the average number of moles of the propyleneoxy groups added and is 0 or more and 50 or less.

In the present disclosure, the wording "a supernatant liquid containing the semiconducting SWCNTs is collected" means that a supernatant liquid is collected in which the ratio of the semiconducting SWCNTs is increased in comparison to the ratios of the semiconducting SWCNTs and the metallic SWCNTs in the separation target SWCNT dispersion obtained in the step A of the dispersion production method of the present disclosure and the separation method of the present disclosure, and the supernatant liquid serves as a semiconducting SWCNT dispersion. In the present disclosure, it is not excluded that the supernatant liquid contains the metallic SWCNTs in a relatively smaller amount compared with the amount of the semiconducting SWCNTs. When the semiconducting SWCNT separability is improved, the ratio of the semiconducting SWCNTs in the SWCNTs contained in the supernatant liquid is increased, and the supernatant liquid is more useful as a material for a semiconductor device.

In the step B of the dispersion production method of the present disclosure and the separation method of the present disclosure, the supernatant liquid can be collected by, for example, separating the supernatant liquid and the remainder thereof. The above-mentioned remainder contains a precipitate that contains the metallic SWCNTs in a relatively larger amount compared with the amount of the semiconducting SWCNTs.

Step A

In one or more embodiments, the step A of the dispersion production method of the present disclosure and the separation method of the present disclosure includes at least a step of preparing a mixed liquid (which may be abbreviated as a "mixed liquid A" hereinafter) containing a copolymer that includes a structural unit A derived from the above-mentioned monomer A and a structural unit B derived from the above-mentioned monomer B, the above-mentioned SWCNT mixture, and an aqueous medium, and then performing dispersion treatment on the mixed liquid A. The mixed liquid A can be prepared by, for example, adding the SWCNT mixture to an aqueous solution of the copolymer.

Copolymer With Structural Unit A Derived From Monomer A and Structural Unit B Derived From Monomer B The copolymer is water-soluble from the viewpoint of improving the semiconducting SWCNT separability. In the present disclosure, the term "water-soluble" means that 1 g or more of the copolymer dissolves in 100 g of water at 20° C.

Structural Unit A Derived From Monomer A

The structural unit A included in the copolymer is a structural unit derived from the monomer A represented by Formula (1) above. In Formula (1) above, $R^0$ is preferably a methyl group from the viewpoint of improving the semiconducting SWCNT separability. In Formula (1) above, M is a hydrogen atom, a metallic atom, or a group having a structure represented by Formula (2) above from the viewpoint of improving the semiconducting SWCNT separability and improving the productivity, but is preferably a hydrogen atom or a group having a structure represented by Formula (2) above, and more preferably a hydrogen atom, from the viewpoint of improving the semiconducting SWCNT separability, improving the productivity, and improving the versatility. The monomer A from which the structural unit A is derived is preferably methacrylic acid.

Structural Unit B Derived From Monomer B

The structural unit B included in the copolymer is a structural unit derived from the monomer B represented by Formula (3) above. The copolymer may include one type of structural unit B or a combination of two or more types of structural units B.

In Formula (3) above, $R^5$ is preferably a methyl group from the viewpoint of improving the semiconducting SWCNT separability.

In Formula (3) above, $R^6$ represents a hydrogen atom or a hydrocarbon group having 1 to 5 carbon atoms from the viewpoint of achieving both an improvement in the semiconducting SWCNT separability and the dispersion stability of the semiconducting SWCNT dispersion, and the viewpoint of the availability of the monomer. In the case where $R^6$ is a hydrocarbon group, the number of carbon atoms therein is preferably 1 or more and 4 or less and more preferably 1 or more and 3 or less from the viewpoint of achieving both an improvement in the semiconducting SWCNT separability and the dispersion stability of the semiconducting SWCNT dispersion, and the viewpoint of the availability of the monomer. In the case where $R^6$ is a hydrocarbon group, an example thereof is an alkyl group. A specific example of $R^6$ is at least one selected from a butyl group, an ethyl group, a methyl group, and a hydrogen atom, and $R^6$ is preferably a methyl group or a hydrogen atom and more preferably a methyl group from the viewpoint of achieving both an improvement of the separability and the dispersion stability. It is more preferable that the copolymer includes both a structural unit B in which $R^6$ is a hydrocarbon group having preferably 1 to 4 carbon atoms and more preferably 1 to 3 carbon atoms and a structural unit B in which $R^6$ is hydrogen, from the viewpoint of achieving both an improvement in the semiconducting SWCNT separability and the dispersion stability of the semiconducting SWCNT dispersion. The number of terminal carbon atoms in the structural unit B, namely the number of carbon atoms in $R^6$, can be calculated from a chemical shift in nuclear magnetic resonance, and specifically, it can be calculated using the method described in the descriptions of examples.

The monomer B from which the structural unit B is derived is preferably 2-hydroxyethyl methacrylate (HEMA), butoxypolyethylene glycol methacrylate, ethoxypolyethylene glycol methacrylate, or methoxypolyethylene glycol (meth)acrylate (PEG(M)A), and more preferably includes methoxypolyethylene glycol methacrylate (PEGMA).

In Formula (3), p is 1 or more from the viewpoint of improving the semiconducting SWCNT separability, and is 120 or less, preferably 100 or less, more preferably 90 or less, even more preferably 60 or less, even more preferably 45 or less, and even more preferably 25 or less, from the viewpoint of improving the semiconducting SWCNT separability and the viewpoint of the availability of the monomer.

In Formula (3), q is 0 or more and 50 or less, preferably 0 or more and 30 or less, more preferably 0 or more and 10 or less, even more preferably 0 or more and 5 or less, even more preferably 0 or more and 3 or less, and even more preferably 0, from the viewpoint of the water-solubility of the copolymer, the viewpoint of improving the semiconducting SWCNT separability, and the viewpoint of the availability of the monomer.

In Formula (3), q/(p+q) is preferably 0.7 or less, more preferably 0.4 or less, and even more preferably 0, from the viewpoint of the water-solubility of the copolymer, the viewpoint of improving the semiconducting SWCNT separability, and the viewpoint of the availability of the monomer.

In Formula (3), there is no limitation on the addition order of the EO group and the PO group, and in the case where q is 2 or more, a block bond or a random bond may be formed.

In the case where the copolymer includes a combination of two or more types of structural units B, a combination of a structural unit $B_1$ in which the average number of moles of the EO groups added, p, is 4 or more and 120 or less, and a structural unit $B_2$ in which p is 1 or more and less than 4 is preferable from the viewpoint of improving the semiconducting SWCNT separability. The average number of moles added, p, in the structural unit $B_1$ is preferably 100 or less, more preferably 90 or less, even more preferably 60 or less, even more preferably 45 or less, and even more preferably 25 or less, from the viewpoint of improving the semiconducting SWCNT separability. The average number of moles added, p, in the structural unit $B_2$ is preferably 3 or less, more preferably 2 or less, and even more preferably 1, from the viewpoint of improving the semiconducting SWCNT separability.

$R^6$ in the structural unit $B_1$ is preferably a hydrocarbon group having 1 to 5 carbon atoms, more preferably a hydrocarbon group having 1 to 4 carbon atoms, and even more preferably a hydrocarbon group having 1 to 3 carbon atoms. $R^6$ in the structural unit $B_2$ is preferably a hydrogen atom.

In the case where the copolymer includes a combination of the structural unit $B_1$ and the structural unit $B_2$ as the structural unit B, the molar ratio ($B_1/B_2$) between the structural unit $B_1$ and the structural unit $B_2$ in the copolymer is preferably 0.01 or more, more preferably 0.03 or more, and even more preferably 0.05 or more, from the viewpoint of improving the semiconducting SWCNT separability, and is preferably 0.5 or less, more preferably 0.4 or less, and even more preferably 0.3 or less, from the viewpoint of improving the semiconducting SWCNT separability.

In the case where the copolymer includes a combination of the structural unit $B_1$ and the structural unit $B_2$ as the structural unit B, the mass ratio ($B_1/B_2$) between the structural unit $B_1$ and the structural unit $B_2$ in the copolymer is preferably 0.1 or more, more preferably 0.2 or more, and even more preferably 0.4 or more, from the viewpoint of improving the semiconducting SWCNT separability, and is preferably 5 or less, more preferably 3 or less, and even more preferably 1 or less, from the viewpoint of improving the semiconducting SWCNT separability.

The content (mass %) of the structural unit A in all the structural units of the copolymer is preferably more than 0 mass %, more preferably 1 mass % or more, even more preferably 2 mass % or more, and even more preferably 3 mass % or more, from the viewpoint of improving the semiconducting SWCNT separability, and is preferably 80 mass % or less, more preferably 50 mass % or less, even more preferably 30 mass % or less, and even more preferably 20 mass % or less, from the viewpoint of improving the dispersion stability of the semiconducting SWCNT dispersion.

The content (mol %) of the structural unit A in all the structural units of the copolymer is preferably more than 0 mol %, more preferably 1 mol % or more, even more preferably 3 mol % or more, even more preferably 5 mol % or more, and even more preferably 8 mol % or more, from the viewpoint of improving the semiconducting SWCNT separability, and is preferably less than 100 mol %, more preferably 90 mol % or less, even more preferably 80 mol % or less, even more preferably 60 mol % or less, even more preferably 40 mol % or less, and even more preferably 25 mol % or less, from the viewpoint of improving the dispersion stability of the semiconducting SWCNT dispersion.

The content (mass %) of the structural unit B in all the structural units of the copolymer is preferably more than 10 mass %, more preferably 50 mass % or more, even more preferably 70 mass % or more, and even more preferably 80 mass % or more, from the viewpoint of improving the dispersion stability of the semiconducting SWCNT dispersion, and is preferably less than 100 mass %, more preferably 97 mass % or less, and even more preferably 95 mass % or less, from the viewpoint of improving the semiconducting SWCNT separability.

The content (mol %) of the structural unit B in all the structural units of the copolymer is preferably more than 0 mol %, more preferably 10 mol % or more, even more preferably 20 mol % or more, even more preferably 30 mol % or more, and even more preferably 50 mol % or more, from the viewpoint of improving the dispersion stability of the semiconducting SWCNT dispersion, and is preferably less than 100 mol %, more preferably 97 mol % or less, even more preferably 95 mol % or less, and even more preferably 92 mol % or less, from the viewpoint of improving the semiconducting SWCNT separability.

The total content (mass %) of the structural unit A and the structural unit B in all the structural units of the copolymer is preferably 80 mass % or more, more preferably 90 mass % or more, even more preferably 95 mass % or more, and even more preferably 99 mass % or more, and is 100 mass % or less, from the viewpoint of achieving both an improvement in the semiconducting SWCNT separability and the dispersion stability of the semiconducting SWCNT dispersion. The total content is even more preferably substantially 100 mass % from the viewpoint of improving the semiconducting SWCNT separability.

The total content (mol %) of the structural unit A and the structural unit B in all the structural units of the copolymer is preferably 80 mol % or more, more preferably 90 mol % or more, even more preferably 95 mol % or more, and even more preferably 99 mol % or more, and is 100 mol % or less, from the viewpoint of achieving both an improvement in the semiconducting SWCNT separability and the dispersion stability of the semiconducting SWCNT dispersion. The total content is even more preferably substantially 100 mol % from the viewpoint of improving the semiconducting SWCNT separability.

The copolymer may include a structural unit C other than the structural units A and B as long as the effects of the present disclosure are not impaired. The copolymer may include one type of structural unit C or a combination of two or more types of structural units C. Examples of a monomer C from which the structural unit C is derived include carboxylic acid-based monomers such as maleic acid other than the monomer A, and structural units derived from nonionic monomers other than the structural unit B. An example of the nonionic monomers is at least one monomer selected from a (meth)acrylic acid ester-based monomer, a (meth)acrylamide-based monomer, a styrene-based monomer, and (meth)acrylonitrile-based monomer, and of these nonionic monomers, a (meth)acrylic acid ester-based monomer is preferable.

In the case where the monomer C is a (meth)acrylic acid ester-based monomer, an example of the monomer C is at least one selected from methyl (meth)acrylate, ethyl (meth)acrylate, 2-ethylhexyl (meth)acrylate, lauryl (meth)acrylate, stearyl (meth)acrylate, and benzyl (meth)acrylate.

In the case where the monomer C is a (meth)acrylamide-based monomer, an example of the monomer C is at least one selected from acrylamide, methacrylamide, dimethylacrylamide, and dimethylmethacrylamide.

In the case where the monomer C is a styrene-based monomer, examples of the monomer C include styrene and methyl styrene.

In the case where the monomer C is a (meth)acrylonitrile-based monomer, examples of the monomer C include acrylonitrile and methacrylonitrile.

From the viewpoint of achieving both an improvement in the semiconducting SWCNT separability and the dispersion stability of the semiconducting SWCNT dispersion, the content of the structural unit C in the copolymer is preferably 20 mass % or less, more preferably 10 mass % or less, even more preferably 5 mass % or less, and even more preferably 1 mass % or less, and it is even more preferable that the copolymer includes substantially no structural unit C. Here, the wording "the copolymer includes substantially no structural unit C" means that the copolymer is intentionally prevented from including the structural unit C. For example, when the structural unit C is included in a raw material monomer or the like from which the structural unit A or the structural unit B is derived, and is thus accidentally included in the copolymer, this corresponds to "the copolymer includes substantially no structural unit C".

The mass ratio (A/B) between the structural unit A and the structural unit B in the copolymer is preferably more than 0, more preferably 0.01 or more, even more preferably 0.03 or more, and even more preferably 0.05 or more, from the viewpoint of improving the semiconducting SWCNT separability, and is preferably 10 or less, more preferably 5 or less, even more preferably 3 or less, even more preferably 1.5 or less, even more preferably 0.5 or less, and even more preferably 0.4 or less, from the viewpoint of improving the dispersion stability of the semiconducting SWCNT dispersion.

The molar ratio (A/B) between the structural unit A and the structural unit B in the copolymer is preferably more than 0, more preferably 0.01 or more, even more preferably 0.05 or more, and even more preferably 0.1 or more, from the viewpoint of improving the semiconducting SWCNT separability, and is preferably 30 or less, more preferably 10 or less, even more preferably 5 or less, even more preferably 3 or less, even more preferably 2 or less, even more preferably 1.1 or less, and even more preferably 0.5 or less, from the viewpoint of improving the dispersion stability of the semiconducting SWCNT dispersion.

The weight-average molecular weight of the copolymer is preferably 1,000 or more, more preferably 2,000 or more, even more preferably 3,000 or more, and even more preferably 4,000 or more, from the viewpoint of improving the semiconducting SWCNT separability, and is preferably 250,000 or less, more preferably 150,000 or less, even more preferably 120,000 or less, and even more preferably 110,000 or less, from the viewpoint of improving the semiconducting SWCNT separability. In the present disclosure, the weight-average molecular weight of the copolymer is determined by gel permeation chromatography, and specifically, it can be measured using the method described in the descriptions of examples.

The mass ratio (copolymer/SWCNT) of the copolymer to the SWCNT in the mixed liquid A and the separation target SWCNT dispersion is preferably 0.5 or more, more preferably 1 or more, even more preferably 2 or more, and even more preferably 4 or more, from the viewpoint of improving the semiconducting SWCNT separability and the viewpoint of improving the productivity, and is preferably 100 or less, more preferably 70 or less, even more preferably 50 or less, and even more preferably 20 or less, from the viewpoint of improving the semiconducting SWCNT separability and the viewpoint of improving the productivity.

The content of the copolymer in the mixed liquid A and the separation target SWCNT dispersion is preferably 0.05 mass % or more, more preferably 0.1 mass % or more, even more preferably 0.15 mass % or more, and even more preferably 0.2 mass % or more, from the viewpoint of improving the semiconducting SWCNT separability and the viewpoint of improving the productivity, and is preferably 10 mass % or less, more preferably 7 mass % or less, and even more preferably 5 mass % or less, from the same viewpoints.

SWCNT

There is no particular limitation on the SWCNTs to be used to prepare the mixed liquid A and the separation target SWCNT dispersion. The SWCNTs are synthesized using, for example, a conventionally known synthesis method such as the HiPco method or the e-DIPS method, and may include those formed in various winding manners and those having various diameters. The SWCNTs may include the metallic SWCNTs and the semiconducting SWCNTs at any ratio, but SWCNTs are commonly synthesized as an SWCNT mixture containing the metallic SWCNTs and the semiconducting SWCNTs at a ratio of about 1:2.

The average diameter of the SWCNTs is preferably 0.5 nm or more and more preferably 0.8 nm or more from the viewpoint of improving the semiconducting SWCNT separability, and is preferably 3 nm or less and more preferably 2 nm or less from the same viewpoint. The average diameter of the SWCNTs can be calculated by measuring the diameters of 10 or more CNTs selected from an image obtained using a transmission electron microscope and averaging the measured diameters.

The average length of the SWCNTs is preferably 0.1 μm or more, more preferably 0.3 μm or more, and even more preferably 0.5 μm or more, from the viewpoint of the electric properties, and is preferably 100 μm or less, more preferably 50 μm or less, even more preferably 20 μm or less, and even more preferably 10 μm or less, from the viewpoint of improving the semiconducting SWCNT separability and the viewpoint of improving the productivity. The average length of the SWCNTs can be calculated by measuring the lengths of 10 or more CNTs selected from an image obtained using a transmission electron microscope and averaging the measured lengths.

The content of the SWCNTs in the mixed liquid A and the separation target SWCNT dispersion is preferably 0.001 mass % or more, more preferably 0.01 mass % or more, and even more preferably 0.03 mass % or more, from the viewpoint of improving the semiconducting SWCNT separability, and is preferably 5 mass % or less, more preferably 1 mass % or less, and even more preferably 0.5 mass % or less, from the viewpoint of improving the semiconducting SWCNT separability and the viewpoint of improving the productivity.

Aqueous Medium

The mixed liquid A and the separation target SWCNT dispersion contains an aqueous medium as a dispersion medium. The aqueous medium is preferably water, and water is preferably pure water, ion-exchanged water, purified water, or distilled water, and more preferably pure water, from the viewpoint of improving the semiconducting SWCNT separability and the viewpoint of improving the productivity.

The mixed liquid A and the separation target SWCNT dispersion may also contain, as the aqueous medium, a water soluble organic solvent such as a lower alcohol (e.g., methanol, ethanol, or isopropyl alcohol), acetone, tetrahydrofuran, or dimethylformamide in addition to water.

In the case of using water together with a dispersion medium other than water as the aqueous medium, the ratio of water in the dispersion medium is preferably 70 mass % or more, more preferably 80 mass % or more, and even more preferably 90 mass % or more, from the viewpoint of improving the semiconducting SWCNT separability.

The content of the aqueous medium in the mixed liquid A and the separation target SWCNT dispersion is preferably 85 mass % or more, more preferably 92 mass % or more, and even more preferably 96 mass % or more, from the viewpoint of improving the semiconducting SWCNT separability and the viewpoint of improving the productivity, and is preferably 99.9 mass % or less, more preferably 99.8 mass % or less, even more preferably 99.5 mass % or less, and even more preferably 99.0 mass % or less, from the same viewpoints.

The dispersion treatment can be performed on the mixed liquid A using, for example, a disperser such as a bath-type ultrasonic disperser, a homomixer, a high-pressure homogenizer, an ultrasonic homogenizer, a jet mill, a bead mill, or Millser.

In the step A, defoaming treatment may be performed on the mixed liquid A prior to the dispersion treatment.

Step B

In the step B of the dispersion production method of the present disclosure and the separation method of the present disclosure, the separation target SWCNT dispersion obtained in the step A is centrifuged, and a supernatant liquid containing semiconducting SWCNTs is collected from the centrifuged separation target SWCNT dispersion. In the supernatant liquid, the ratio of the semiconducting SWCNTs is increased in comparison to the ratios of the semiconducting SWCNTs and the metallic SWCNTs in the separation target SWCNT dispersion prior to being centrifuged. The ratio of the semiconducting SWCNTs varies depending on the centrifugation conditions and the like. The rotational speed of a centrifuge is preferably 5,000 rpm or more and more preferably 10,000 rpm or more from the viewpoint of improving the semiconducting SWCNT separability and the viewpoint of improving the productivity, and is preferably 100,000 rpm or less and more preferably 70,000 rpm or less from the same viewpoints. The gravitational acceleration of a centrifuge is preferably 10 kG or more and more preferably 50 kG or more from the viewpoint of improving the semiconducting SWCNT separability and the viewpoint of improving the productivity, and is preferably 1000 kG or less and more preferably 500 KG or less from the same viewpoints.

Method for Producing Semiconducting SWCNT, and Semiconducting SWCNTs

Semiconducting SWCNTs can be produced by collecting the semiconducting SWCNTs from the semiconducting SWCNT dispersion produced using the method for producing a semiconducting SWCNT dispersion according to the present disclosure. The semiconducting SWCNTs can be collected from the semiconducting SWCNT dispersion by separating the semiconducting SWCNTs from the semiconducting SWCNT dispersion by filtration using a membrane filter and then drying the separated semiconducting SWCNTs. In the case of separating the semiconducting SWCNTs from the semiconducting SWCNT dispersion by filtration, pretreatment such as reprecipitation of the semiconducting SWCNTs may be performed before the semiconducting SWCNT dispersion is filtered. Alternatively, the semiconducting SWCNTs can be collected by drying the semiconducting SWCNT dispersion and removing the coexisting copolymer using a technique such as washing or thermal decomposition. Accordingly, an aspect of the present disclosure relates to a method for producing a semiconducting SWCNT (also referred to as "a semiconducting SWCNT production method A of the present disclosure" hereinafter) that includes a step of collecting semiconducting SWCNTs by filtering the semiconducting SWCNT dispersion obtained using the method for producing a semiconducting SWCNT dispersion according to the present disclosure. Also, another aspect of the present disclosure relates to a method for producing a semiconducting SWCNT (also referred to as "a semiconducting SWCNT production method B of the present disclosure" hereinafter) that includes a step of obtaining a mixture containing semiconducting SWCNTs and the copolymer by drying the semiconducting SWCNT dispersion obtained using the method for producing a semiconducting SWCNT dispersion according to the present disclosure, and a step of collecting the semiconducting SWCNTs by removing the copolymer from the mixture. Also, yet another aspect of the present disclosure relates to semiconducting SWCNTs (also referred to as "semiconducting SWCNTs of the present disclosure" hereinafter) obtained using the semiconducting SWCNT production method A or B of the present disclosure.

Method for Producing Semiconducting SWCNT-Containing Ink

An aspect of the present disclosure relates to a method for producing semiconducting SWCNT-containing ink (also referred to as "a method for producing semiconducting SWCNT-containing ink according to the present disclosure" hereinafter) that includes, as one step, the method for producing a semiconducting SWCNT dispersion according to the present disclosure or the semiconducting SWCNT production method of the present disclosure. For example, an embodiment of the method for producing semiconducting SWCNT-containing ink according to the present disclosure includes the semiconducting SWCNT production method A or B of the present disclosure as one step, and also includes a step of mixing the semiconducting SWCNTs, at least one of an organic solvent and water, and, as needed, at least one of a surfactant and a resin. Also, for example, another embodiment of the method for producing semiconducting SWCNT-containing ink according to the present disclosure includes, as one step, the method for producing a semiconducting SWCNT dispersion according to the present disclosure, and also includes a step of mixing, as needed, the semiconducting SWCNT dispersion and at least one of an organic solvent, a surfactant, and a resin that are mixable with the dispersion.

Examples of the organic solvent include aliphatic solvents such as n-hexane, n-octane, and n-decane; alicyclic solvents such as cyclohexane; aromatic solvents such as benzene and toluene; alcohol solvents such as methanol and ethanol; and glycol ether solvents such as diethylene glycol monomethyl ether, propylene glycol monomethyl ether acetate, and butyl cellosolve. From the viewpoint of improving the film forming properties, the semiconducting SWCNT-containing ink may further contain, for example, a polystyrene resin, an acrylic resin, a vinyl resin, or the like as the resin that can be dissolved or dispersed in the solvent, or a known surfactant or another additive as a dispersant. The content of the semiconducting SWCNTs in the semiconducting SWCNT-containing ink need only be determined as appropriate depending on the applications thereof.

Semiconducting SWCNT-Containing Ink

An aspect of the present disclosure relates to semiconducting SWCNT-containing ink (also referred to as "semiconducting SWCNT-containing ink of the present disclosure" hereinafter) containing semiconducting SWCNTs, at least one of an organic solvent and water, and a copolymer that includes a structural unit A derived from a monomer represented by Formula (1) above and a structural unit B derived from a monomer represented by Formula (3) above.

An embodiment of the semiconducting SWCNT-containing ink of the present disclosure contains at least the semiconducting SWCNTs of the present disclosure, the copolymer that includes the structural unit A derived from a monomer represented by Formula (1) above and the structural unit B derived from a monomer represented by Formula (3) above, and at least one of an organic solvent and water, and contains a surfactant and a resin as needed.

Method for Producing Semiconductor Device

An aspect of the present disclosure relates to a method for producing a semiconductor device that includes a step of forming a semiconductor layer by printing or applying, onto a substrate, the semiconducting SWCNT-containing ink obtained using the method for producing semiconducting SWCNT-containing ink according to the present disclosure.

Also, another aspect of the present disclosure relates to a method for producing a semiconductor device having substrate, and a gate electrode, a source electrode, and a drain electrode that are disposed on the substrate, the method including a step of forming a semiconductor circuit or a semiconductor film (semiconductor layer) by printing or applying the semiconducting SWCNT-containing ink. Examples of the semiconducting SWCNT-containing ink printing method include ink-jet printing, screen printing, offset printing, and anastatic printing. The method may also include a step of forming a circuit by forming a semiconductor film through printing or application and then performing etching or the like.

The present application further discloses a method for producing a semiconducting single-walled carbon nanotube dispersion, a method for separating a semiconducting single-walled carbon nanotube and a metallic single-walled carbon nanotube, a method for producing semiconducting single-walled carbon nanotube-containing ink, and semiconducting single-walled carbon nanotube-containing ink, which are as described below.

<1> A method for producing a semiconducting single-walled carbon nanotube dispersion, including:

a step of preparing a separation target single-walled carbon nanotube dispersion containing single-walled carbon nanotubes that include semiconducting single-walled carbon nanotubes and metallic single-walled carbon nanotubes, an aqueous medium, and a polymer; and a step of centrifuging the separation target single-walled carbon nanotube dispersion and then collecting a supernatant liquid containing the semiconducting single-walled carbon nanotubes from the centrifuged separation target single-walled carbon nanotube dispersion, wherein the polymer is a copolymer that includes a structural unit A derived from a monomer represented by Formula (1) below and a structural unit B derived from a monomer represented by Formula (3) below:

$$CH_2=CR^0-COOM \quad (1)$$

where $R^0$ represents a hydrogen atom or a methyl group, and M represents one of a hydrogen atom, a metallic atom, and a group having a structure represented by Formula (2) below:

$$R^1-\underset{\underset{R^3}{|}}{\overset{\overset{R^4}{|}}{N}}-R^2 \quad (2)$$

where $R^1$, $R^2$, $R^3$, and $R^4$ independently represent a hydrogen atom or an alkyl group having 1 or 2 carbon atoms that optionally has a hydroxyl group; and

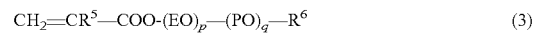

$$CH_2=CR^5-COO\text{-}(EO)_p-(PO)_q-R^6 \quad (3)$$

where $R^5$ represents a hydrogen atom or a methyl group, and $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

<2> A method for producing a semiconducting single-walled carbon nanotube dispersion, including:

a step of preparing a separation target single-walled carbon nanotube dispersion containing single-walled carbon nanotubes that include semiconducting single-walled carbon nanotubes and metallic single-walled carbon nanotubes, an aqueous medium, and a polymer; and a step of centrifuging the separation target single-walled carbon nanotube dispersion and then collecting a supernatant liquid containing the semiconducting single-walled carbon nanotubes from the centrifuged separation target single-walled carbon nanotube dispersion, wherein the polymer is a copolymer that includes a structural unit A derived from a monomer represented by Formula (1) below and a structural unit B derived from a monomer represented by Formula (3) below, and contents of the structural unit A and the structural unit B in all the structural units of the copolymer are more than 0 mol % and less than 100 mol %, and more than 0 mol % and less than 100 mol %, respectively:

$$CH_2=CR^0-COOM \quad (1)$$

where $R^0$ represents a hydrogen atom or a methyl group, and M represents one of a hydrogen atom, a metallic atom, and a group having a structure represented by Formula (2) below:

$$R^1-\underset{\underset{R^3}{|}}{\overset{\overset{R^4}{|}}{N}}-R^2 \quad (2)$$

where $R^1$, $R^2$, $R^3$, and $R^4$ independently represent a hydrogen atom or an alkyl group having 1 or 2 carbon atoms that optionally has a hydroxyl group; and

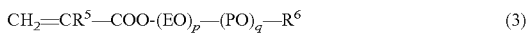

$$CH_2=CR^5-COO-(EO)_p-(PO)_q-R^6 \quad (3)$$

where $R^5$ represents a hydrogen atom or a methyl group, and $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

<3> A method for producing a semiconducting single-walled carbon nanotube dispersion, including:

a step of preparing a separation target single-walled carbon nanotube dispersion containing single-walled carbon nanotubes that include semiconducting single-walled carbon nanotubes and metallic single-walled carbon nanotubes, an aqueous medium, and a polymer; and a step of centrifuging the separation target single-walled carbon nanotube dispersion and then collecting a supernatant liquid containing the semiconducting single-walled carbon nanotubes from the centrifuged separation target single-walled carbon nanotube dispersion, wherein the polymer is a copolymer that includes a structural unit A derived from a monomer represented by Formula (1) below and a structural unit B derived from a monomer represented by Formula (3) below, and contents of the structural unit A and the structural unit B in all the structural units of the copolymer are more than 0 mol % and less than 100 mol %, and more than 0 mol % and less than 100 mol %, respectively:

$$CH_2=CR^0-COOM \quad (1)$$

where $R^0$ represents a hydrogen atom or a methyl group, and M represents one of a hydrogen atom, a metallic atom, and a group having a structure represented by Formula (2) below:

$$R^1-\underset{\underset{R^3}{|}}{\overset{\overset{R^4}{|}}{N}}-R^2 \quad (2)$$

where $R^1$, $R^2$, $R^3$, and $R^4$ independently represent a hydrogen atom or an alkyl group having 1 or 2 carbon atoms that optionally has a hydroxyl group; and

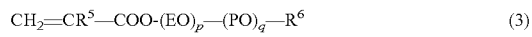

$$CH_2=CR^5-COO-(EO)_p-(PO)_q-R^6 \quad (3)$$

where $R^5$ represents a hydrogen atom or a methyl group, and $R^6$ represents a hydrogen atom or a methyl group, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

<4> The method for producing a semiconducting single-walled carbon nanotube dispersion according to any one of <1> to <3>, wherein a mass ratio (A/B) between the structural unit A and the structural unit B in the copolymer is 0.01 or more and 10 or less.

<5> The method for producing a semiconducting single-walled carbon nanotube dispersion according to any one of <1> to <3>, wherein a molar ratio (A/B) between the structural unit A and the structural unit B in the copolymer is 0.05 or more and 30 or less.

<6> The method for producing a semiconducting single-walled carbon nanotube dispersion according to any one of <1> to <5>, wherein a content (mol %) of the structural unit A in all the structural units of the copolymer is 1 mol % or more and less than 100 mol %.

<7> The method for producing a semiconducting single-walled carbon nanotube dispersion according to any one of <1> to <6>, wherein a content (mol %) of the structural unit B in all the structural units of the copolymer is more than 0 mol % and less than 100 mol %.

<8> The method for producing a semiconducting single-walled carbon nanotube dispersion according to any one of <1> to <7>, wherein the structural unit B included in the copolymer is a combination of a structural unit $B_1$ in which the average number of moles of the ethyleneoxy groups added, p, is 4 or more and 120 or less, and a structural unit $B_2$ in which the average number of moles of the ethyleneoxy groups added, p, is 1 or more and less than 4.

<9> The method for producing a semiconducting single-walled carbon nanotube dispersion according to <8>, wherein a molar ratio ($B_1/B_2$) between the structural unit $B_1$ and the structural unit $B_2$ in the copolymer is 0.01 or more and 0.5 or less.

<10> The method for producing a semiconducting single-walled carbon nanotube dispersion according to <8>, wherein a mass ratio ($B_1/B_2$) between the structural unit $B_1$ and the structural unit $B_2$ in the copolymer is 0.1 or more and 5 or less.

<11> A method for producing a semiconducting single-walled carbon nanotube, including a step of collecting a semiconducting single-walled carbon nanotube by filtering a semiconducting single-walled carbon nanotube dispersion obtained using the method for producing a semiconducting single-walled carbon nanotube dispersion according to any one of <1> to <10>.

<12> A method for producing a semiconducting single-walled carbon nanotube, including:

a step of obtaining a mixture containing a semiconducting single-walled carbon nanotube and the copolymer by drying a semiconducting single-walled carbon nanotube dispersion obtained using the method for producing a semiconducting single-walled carbon nanotube dispersion according to any one of <1> to <10>; and a step of collecting a semiconducting single-walled carbon nanotube by removing the copolymer from the mixture.

<13> A method for producing semiconducting single-walled carbon nanotube-containing ink, including the production method according to any one of <1> to <10> as one step.

<14> Semiconducting single-walled carbon nanotube-containing ink, including:

semiconducting single-walled carbon nanotubes;
at least one of an organic solvent and water; and
a copolymer that includes a structural unit A derived from a monomer represented by Formula (1) below and a structural unit B derived from a monomer represented by Formula (3) below:

$CH_2=CR^0-COOM$      (1)

where $R^0$ represents a hydrogen atom or a methyl group, and M represents one of a hydrogen atom, a metallic atom, and a group having a structure represented by Formula (2) below:

(2)

where $R^1$, $R^2$, $R^3$, and $R^4$ independently represent a hydrogen atom or an alkyl group having 1 or 2 carbon atoms that optionally has a hydroxyl group; and

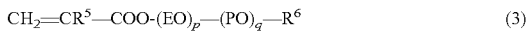

$CH_2=CR^5-COO-(EO)_p-(PO)_q-R^6$      (3)

where $R^5$ represents a hydrogen atom or a methyl group, and $R^6$ represents a hydrogen atom or a methyl group, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

Hereinafter, the present disclosure will be described in more detail by way of examples, but these examples are merely exemplary, and the present disclosure is not limited to these examples.

1. Measurement Methods for Various Parameters

Measurement of Weight-Average Molecular Weight of Copolymer

The weight-average molecular weight of the copolymer used to prepare the separation target SWCNT dispersion was measured by gel permeation chromatography (also referred to as "GPC" hereinafter) under the following conditions.

GPC Conditions
Measurement Apparatus: HLC-8320GPC (manufactured by Tosoh Corporation)
Column: α-M+α-M (manufactured by Tosoh Corporation)
Eluate: Solution of 60 mmol/L $H_3PO_4$ and 50 mmol/L LiBr in N,N-dimethylformamide (DMF)
Flow rate: 1.0 mL/min
Column temperature: 40° C.
Detection: RI
Sample size: 0.5 mg/mL
Standard substance: monodisperse polystyrene (manufactured by Tosoh Corporation)

Measurement Methods for Numbers of Moles of EO and PO Added

The numbers of moles of EO and PO added in the copolymer used to prepare the separation target SWCNT dispersion were measured using a nuclear magnetic resonance method (also referred to as "NMR" hereinafter) under the following conditions. The numbers of moles of EO and PO added were calculated from the values obtained through integration of the chemical shifts.

NMR Conditions
Measurement apparatus: Vnmrs400 (manufactured by Agilent)
Measurement solvent: deuteriochloroform (containing 0.05% TMS) (manufactured by FUJIFILM Wako Pure Chemical Corporation)
Measured chemical species: 1H Measurement Method for Number of Terminal Carbon Atoms of PEGMA in Copolymer The number of terminal carbon atoms of PEGMA in the copolymer used to prepare the separation target SWCNT dispersion was measured using a nuclear magnetic resonance method (also referred to as "NMR" hereinafter) under the following conditions. The number of the terminal carbon atoms was calculated from the values obtained through integration of the chemical shifts.

NMR Conditions
Measurement apparatus: Vnmrs400 (manufactured by Agilent)
Measurement solvent: deuteriochloroform (containing 0.05% TMS) (manufactured by FUJIFILM Wako Pure Chemical Corporation)
Measured chemical species: 1H, 13C Evaluation of Water-Solubility 1 g of the copolymer was added to 100 g of water at 20° C. The mixture was stirred for 5 minutes and was then visually observed to check whether or not insoluble matter was present. When no insoluble matter was observed, the copolymer was determined as being water-soluble. In Tables 1 and 2, "A" represents the determination that the copolymer was water-soluble, and "B" represents the determination that the copolymer was not water-soluble.

Measurements of Average Diameter and Average Length of SWCNTs

The average diameter and the average length of the SWCNTs were calculated by measuring the diameters and the lengths of 10 or more CNTs selected from an image obtained using a transmission electron microscope and averaging the measured diameters and lengths.

2. Production of Copolymers a to i

Copolymer a 15 g of ethanol (manufactured by FUJIFILM Wako Pure Chemical Corporation) was put into a reaction vessel equipped with a stirrer, a reflux tube, a thermometer, a dropping funnel 1, and a dropping funnel 2. The reaction system was purged with nitrogen under stirring and was then heated to 90° C. A mixed solution of a monomer (15 g (71.2 mol %) of methacrylic acid (manufactured by FUJIFILM Wako Pure Chemical Corporation) and 35 g (28.8 mol %) of methoxypolyethylene glycol (9) monomethacrylate ("M-90G" manufactured by Shin-Nakamura Chemical Co, Ltd.)) and 10 g of ethanol was provided in the dropping funnel 1, and a mixed solution of 1.59 g (6.0 mol % with respect to the total amount of the monomers) of 3-mercapto-1,2-propanediol (manufactured by FUJIFILM Wako Pure Chemical Corporation) serving as a chain transfer agent, 0.304 g (0.5 mol % with respect to the total amount of the monomers) of 2,2'-azobis(2,4-dimethylvaleronitrile) ("V-65B" manufactured by FUJIFILM Wako Pure Chemical Corporation) serving as a polymerization initiator, and 50.5 g of ethanol was provided in the dropping funnel 2. The mixed solutions were simultaneously dripped into the reaction vessel over 1 hour. After dripping of the mixed solutions was finished, the mixture was aged for 1 hour under stirring to finish the reaction. Thus, a copolymer a was obtained.

Copolymers b to i

Copolymers b to i were obtained by performing production methods in the same manner as the production method for the copolymer a, except that the types of monomers, the amounts of monomers, the amount of the chain transfer agent, and the amount of the polymerization initiator were changed to those shown in Table 1.

The physical properties of the obtained copolymers a to i are shown in Table 1 below.

The monomers used to produce the copolymers a to i are as follows.

Monomer A
   MAA: methacrylic acid (manufactured by FUJIFILM Wako Pure Chemical Corporation)
   AA: acrylic acid ("special grade", manufactured by FUJIFILM Wako Pure Chemical Corporation)

Monomer $B_1$
   PEG(9)MA: methoxypolyethylene glycol (9) monomethacrylate ("M-90G" manufactured by Shin-Nakamura Chemical Co, Ltd.) ($R^6$=methyl, $R^5$=methyl, p=9, q=0 in Formula (3))

Monomer $B_1$
   PEG(23)MA: methoxypolyethylene glycol (23) monomethacrylate ("M-230G" manufactured by Shin-Nakamura Chemical Co, Ltd.) ($R^6$=methyl, $R^5$=methyl, p=23, q=0 in Formula (3))

Monomer $B_1$
   PEG(90)MA: methoxypolyethylene glycol (90) monomethacrylate ("M-900G" manufactured by Shin-Nakamura Chemical Co, Ltd.) ($R^6$=methyl, $R^5$=methyl, p=90, q=0 in Formula (3))

Monomer $B_1$
   PEG(20)PG(3)MA: methoxypolyethylene glycol (20) polypropylene glycol (3) monomethacrylate ("M-0320PE" manufactured by Shin-Nakamura Chemical Co, Ltd.) ($R^6$=methyl, $R^5$=methyl, p=20, q=3 in Formula (3))

Monomer $B_1$
   PEG(45)MA: methoxypolyethylene glycol (45) monomethacrylate ("M-450G" manufactured by Shin-Nakamura Chemical Co, Ltd.) ($R^6$=methyl, $R^5$=methyl, p=45, q=0 in Formula (3))

Monomer $B_2$
   HEMA: 2-hydroxyethyl methacrylate (manufactured by FUJIFILM Wako Pure Chemical Corporation) ($R^6$=H, $R^5$=methyl, p=1, q=0 in Formula (3))

Other Monomer
   PDEA: phenoxy dioxyethylene acrylate ("Light Acrylate P2H-A" manufactured by Kyoeisha Chemical Co., Ltd.)

TABLE 1

| Copolymer | Monomer for structural unit A Type | Monomer for structural unit A mol % (mass %) | | Monomer for structural unit B Type | Monomer for structural unit B mol % (mass %) | Polymerization conditions — Chain transfer agent mol % (with respect to monomers) | Polymerization conditions — Polymerization initiator mol % (with respect to monomers) | A/B molar ratio (mass ratio) | $B_1/B_2$ molar ratio (mass ratio) | PEGMA terminal carbon number | Weight-average molecular weight | Water-solubility |
|---|---|---|---|---|---|---|---|---|---|---|---|---|
| a | MAA | 71.2 (30) | — | PEG(9)MA | 28.8 (70) | 6.0 | 0.5 | 2.47 (0.43) | — | 1 | 7800 | A |
| b | MAA | 50.4 (15) | — | PEG(9)MA | 49.6 (85) | 10.0 | 0.5 | 1.02 (0.18) | — | 1 | 7800 | A |
| c | MAA | 20 (10) | $B_1$ | PEG(9)MA | 13.9 (40) | 3.0 | 0.5 | 0.25 (0.11) | 0.21 (0.8) | 1 | 17500 | A |
|   |     |         | $B_2$ | HEMA | 66.1 (50) |   |   |   |   |   |   |   |
| d | MAA | 10.3 (5) | $B_1$ | PEG(9)MA | 14.4 (40) | 3.0 | 0.5 | 0.11 (0.05) | 0.19 (0.73) | 1 | 17300 | A |
|   |     |         | $B_2$ | HEMA | 75.3 (55) |   |   |   |   |   |   |   |
| e | MAA | 9.9 (5) | $B_1$ | PEG(23)MA | 4.6 (30) | 3.0 | 0.5 | 0.11 (0.05) | 0.05 (0.46) | 1 | 22000 | A |
|   |     |         | $B_2$ | HEMA | 85.5 (65) |   |   |   |   |   |   |   |
| f | AA | 99.2 (97) | — | AA/PDEA | 0.8 (3) | 2.3 | 0.5 | — | — | 6 | 7000 | A |

TABLE 1-continued

| | | | | | | | Polymerization conditions | | | | | |
|---|---|---|---|---|---|---|---|---|---|---|---|---|
| | Monomer for structural unit A | | | Monomer for structural unit B | | | Chain transfer agent mol % (with respect to monomers) | Polymerization initiator mol % (with respect to monomers) | A/B molar ratio (mass ratio) | $B_1/B_2$ molar ratio (mass ratio) | PEGMA terminal carbon number | Weight-average molecular weight | Water-solubility |
| Copolymer | Type | mol % (mass %) | | Type | mol % (mass %) | | | | | | | | |
| g | MAA | 17.6 (10) | $B_1$ | PEG(90)MA | 1.3 (30) | | 1.0 | 0.5 | 0.21 (0.11) | 0.016 (0.5) | 1 | 83000 | A |
| | | | $B_2$ | HEMA | 81.1 (60) | | | | | | | | |
| h | MAA | 18.1 (10) | $B_1$ | PEG(20)PG(3)MA | 5.5 (35) | | 0.5 | 0.5 | 0.22 (0.11) | 0.072 (0.64) | 1 | 140000 | A |
| | | | $B_2$ | HEMA | 76.5 (55) | | | | | | | | |
| i | MAA | 19.8 (10) | $B_1$ | PEG(45)MA | 3.8 (40) | | 1.0 | 0.5 | 0.25 (0.11) | 0.050 (0.8) | 1 | 65000 | A |
| | | | $B_2$ | HEMA | 76.4 (50) | | | | | | | | |

3. Preparation of Semiconducting SWCNT Dispersion

Examples 1 to 8

A mixed liquid was obtained by adding 30 mg of an SWCNT mixture ("HiPco-Raw" manufactured by NanoIntegris; average diameter: 0.8 to 1.2 nm, average length: 0.4 to 0.7 μm) synthesized using the HiPco method to 30 mL of a 0.5 mass % aqueous solution obtained by dissolving each copolymer shown in Table 1 in ultrapure water (manufactured by Wako Pure Chemical Industries, Ltd.).

Next, dispersion treatment was performed on the mixed liquid using an ultrasonic homogenizer ("450D" manufactured by BRANSON) under the conditions of AMPLITUDE 30% and 10° C. for 10 minutes while the mixed liquid was stirred using a stirrer. Thus, separation target SWCNT dispersions of Examples 1 to 8 were obtained. The types and the contents of the components in the separation target SWCNT dispersions are shown in Table 2. In each separation target SWCNT dispersion, the contents of the SWCNT mixture and the copolymer were as shown in Table 2, and the content of the aqueous medium was set as the content of the remaining portion excluding the SWCNT mixture and the copolymer.

Each of the obtained separation target SWCNT dispersions was centrifuged using an ultracentrifuge ("CS100GXII" manufactured by Hitachi Koki Co., Ltd., rotor: S50A) at a rate of 50000 rpm, a gravitational acceleration of 210 kG, and 20° C. for 30 minutes. Thereafter, 80 vol % of the supernatant liquid was collected from the liquid surface while care was taken of not stirring up precipitated sediment. Thus, semiconducting SWCNT dispersions of Examples 1 to 8 were obtained.

Comparative Example 1

A separation target SWCNT dispersion and a supernatant liquid (semiconducting SWCNT dispersion) of Comparative Example 1 were obtained in the same manner as in Example 1, except that the copolymer f was used instead of the copolymer a. In the separation target SWCNT dispersion, the contents of the SWCNT mixture and the copolymer were as shown in Table 2, and the content of the aqueous medium was set as the content of the remaining portion excluding the SWCNT mixture and the compound copolymer.

4. Evaluations

Evaluation of Separability

The absorbance was measured using an ultraviolet-visible-near infrared spectrophotometer ("UV-3600 Plus" manufactured by Shimadzu Corporation) with which absorbance can be measured in a range from visible light to infrared light. A ratio between the peak intensity at an absorption wavelength specific to a semiconducting SWCNT and the peak intensity at an absorption wavelength specific to a metallic SWCNT was used as an evaluation value for the semiconducting SWCNT separability. The higher the calculated value is, the higher evaluation the semiconducting SWCNT separability can be given. When the value is 1.2 or greater, the semiconducting SWCNT separability is high enough. Table 2 shows the results.

$$\frac{I_s(\text{peak intensity at absorption wavelength specific to semiconducting } SWCNT)}{I_m(\text{peak intensity at absorption wavelength specific to metallic } SWCNT)} = \text{semiconducting } SWCNT \text{ separability}$$

Note that, regarding the SWCNTs (HIPCO) used, the absorption wavelength specific to a semiconducting SWCNT was around 730 nm, and the absorption wavelength specific to a metallic SWCNT was around 480 nm.

Evaluation of Dispersion Stability

The state of dispersion of the semiconducting SWCNTs in the semiconducting SWCNT dispersion that had been left to stand for 2 weeks at room temperature (25° C.) was evaluated based on the following evaluation criterion. Table 2 shows the results.

Evaluation Criterion

A: No agglomerates were visually observed.

B: Several (less than six) agglomerates were visually observed.

C: Many agglomerates were visually observed.

TABLE 2

| | Separation target SWCNT dispersion | | | | | | | |
|---|---|---|---|---|---|---|---|---|
| | SWNT mixture | Copolymer | | | PEGMA terminal | | Evaluation results | |
| | Content (mass %) | Type | Monomer | Content (mass %) | carbon number | Aqueous medium Type | Separability | Dispersion stability |
| Ex. 1 | 0.1 | a | MAA/PEG(9)MA | 0.5 | 1 | Ultrapure water | 1.41 | B |
| Ex. 2 | 0.1 | b | MAA/PEG(9)MA | 0.5 | 1 | Ultrapure water | 1.61 | A |
| Ex. 3 | 0.1 | c | MAA/PEG(9)MA/HEMA | 0.5 | 1 | Ultrapure water | 3.02 | A |
| Ex. 4 | 0.1 | d | MAA/PEG(9)MA/HEMA | 0.5 | 1 | Ultrapure water | 2.12 | A |
| Ex. 5 | 0.1 | e | MAA/PEG(23)MA/HEMA | 0.5 | 1 | Ultrapure water | 1.95 | A |
| Comp. Ex. 1 | 0.1 | f | AA/PDEA | 0.5 | 6 | Ultrapure water | 1.82 | C |
| Ex. 6 | 0.1 | g | MAA/PEG(90)MA/HEMA | 0.5 | 1 | Ultrapure water | 1.48 | A |
| Ex. 7 | 0.1 | h | MAA/PEG(20)PG(3)MA/HEMA | 0.5 | 1 | Ultrapure water | 1.65 | A |
| Ex. 8 | 0.1 | i | MAA/PEG(45)MA/HEMA | 0.5 | 1 | Ultrapure water | 1.78 | A |

As shown in Table 2, in Examples 1 to 8, both high semiconducting SWCNT separability and the dispersion stability of the semiconducting SWCNTs in the semiconducting SWCNT dispersion were favorably achieved compared with Comparative Example 1.

INDUSTRIAL APPLICABILITY

As described above, with the method for producing a semiconducting SWCNT dispersion according to the present disclosure, both high semiconducting SWCNT separability and the dispersion stability of the semiconducting SWCNTs in the semiconducting SWCNT dispersion can be favorably achieved, and thus an improvement in the quality of semiconducting SWCNT-containing ink can be expected.

The invention claimed is:

1. A method for producing a semiconducting single-walled carbon nanotube dispersion, comprising:
    a step of preparing a separation target single-walled carbon nanotube dispersion containing single-walled carbon nanotubes that include semiconducting single-walled carbon nanotubes and metallic single-walled carbon nanotubes, an aqueous medium, and a polymer; and
    a step of centrifuging the separation target single-walled carbon nanotube dispersion and then collecting a supernatant liquid containing the semiconducting single-walled carbon nanotubes from the centrifuged separation target single-walled carbon nanotube dispersion,
    wherein the polymer is a copolymer that includes a structural unit A derived from a monomer represented by Formula (1) below and a structural unit B derived from a monomer represented by Formula (3) below:

$$CH_2\!\!=\!\!CR^0\!\!-\!\!COOM \qquad (1)$$

where $R^0$ represents a hydrogen atom or a methyl group, and M represents one of a hydrogen atom, a metallic atom, and a group having a structure represented by Formula (2) below:

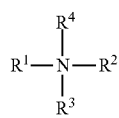

(2)

where $R^1$, $R^2$, $R^3$, and $R^4$ independently represent a hydrogen atom or an alkyl group having 1 or 2 carbon atoms that optionally has a hydroxyl group; and $$CH_2\!\!=\!\!CR^5\!\!-\!\!COO\text{-}(EO)_p\!\!-\!\!(PO)_q\!\!-\!\!R^6 \qquad (3)$$

where $R^5$ represents a hydrogen atom or a methyl group, and $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

2. The method for producing a semiconducting single-walled carbon nanotube dispersion according to claim 1, wherein a content of the structural unit A in all the structural units of the copolymer is more than 0 mol % and 90 mol % or less.

3. The method for producing a semiconducting single-walled carbon nanotube dispersion according to claim 1, wherein a content of the structural unit B in all the structural units of the copolymer is 10 mol % or more and less than 100 mol %.

4. The method for producing a semiconducting single-walled carbon nanotube dispersion according to claim 1, wherein the terminal structure $R^6$ of the monomer represented by Formula (3) above is a hydrogen atom or a methyl group.

5. The method for producing a semiconducting single-walled carbon nanotube dispersion according to claim 1, wherein the single-walled carbon nanotubes used to prepare the separation target single-walled carbon nanotube dispersion have an average diameter of 0.5 nm or more and 3 nm or less.

6. A method for producing a semiconducting single-walled carbon nanotube, comprising
    a step of collecting a semiconducting single-walled carbon nanotube by filtering a semiconducting single-walled carbon nanotube dispersion obtained using the method for producing a semiconducting single-walled carbon nanotube dispersion according to claim 1.

7. A method for producing a semiconducting single-walled carbon nanotube, comprising:
    a step of obtaining a mixture containing a semiconducting single-walled carbon nanotube and the copolymer by drying a semiconducting single-walled carbon nanotube dispersion obtained using the method for producing a semiconducting single-walled carbon nanotube dispersion according to claim 1; and a step of collecting a semiconducting single-walled carbon nanotube by removing the copolymer from the mixture.

8. A method for producing semiconducting single-walled carbon nanotube-containing ink, comprising the production method according to claim 1 as one step.

9. The method for producing a semiconducting single-walled carbon nanotube dispersion according to claim 1, wherein a content of the structural unit A in all the structural units of the copolymer is more than 0 mass % and 80 mass % or less.

10. The method for producing a semiconducting single-walled carbon nanotube dispersion according to claim 1, wherein a content of the structural unit B in all the structural units of the copolymer is more than 10 mass % and less than 100 mass %.

11. The method for producing a semiconducting single-walled carbon nanotube dispersion according to claim 1, wherein a molar ratio (A/B) between the structural unit A and the structural unit B in the copolymer is more than 0 and 30 or less.

12. The method for producing a semiconducting single-walled carbon nanotube dispersion according to claim 1, wherein a mass ratio (A/B) between the structural unit A and the structural unit B in the copolymer is more than 0 and 10 or less.

13. The method for producing a semiconducting single-walled carbon nanotube dispersion according to claim 1, wherein the structural unit B included in the copolymer is a combination of a structural unit $B_1$ in which the average number of moles of the ethyleneoxy groups added, p, is 4 or more and 120 or less, and a structural unit $B_2$ in which the average number of moles of the ethyleneoxy groups added, p, is 1 or more and less than 4.

14. The method for producing a semiconducting single-walled carbon nanotube dispersion according to claim 13, wherein a molar ratio ($B_1/B_2$) between the structural unit $B_1$ and the structural unit $B_2$ is 0.01 or more and 0.5 or less.

15. The method for producing a semiconducting single-walled carbon nanotube dispersion according to claim 13, wherein a mass ratio ($B_1/B_2$) between the structural unit $B_1$ and the structural unit $B_2$ in the copolymer is 0.1 or more and 5 or less.

16. The method for producing a semiconducting single-walled carbon nanotube dispersion according to claim 1, wherein, p in Formula (3) above is 1 or more and 90 or less.

17. The method for producing a semiconducting single-walled carbon nanotube dispersion according to claim 1, wherein, q in Formula (3) above is 0 or more and 30 or less.

18. The method for producing a semiconducting single-walled carbon nanotube dispersion according to claim 1, wherein, a weight-average molecular weight of the copolymer is 1,000 or more and 250,000 or less.

19. A method for separating a semiconducting single-walled carbon nanotube and a metallic single-walled carbon nanotube, comprising:

a step of preparing a separation target single-walled carbon nanotube dispersion containing single-walled carbon nanotubes that include semiconducting single-walled carbon nanotubes and metallic single-walled carbon nanotubes, an aqueous medium, and a polymer; and a step of centrifuging the separation target single-walled carbon nanotube dispersion and then collecting a supernatant liquid containing the semiconducting single-walled carbon nanotubes from the centrifuged separation target single-walled carbon nanotube dispersion, wherein the polymer is a copolymer that includes a structural unit A derived from a monomer represented by Formula (1) below and a structural unit B derived from a monomer represented by Formula (3) below:

where $R^0$ represents a hydrogen atom or a methyl group, and M represents one of a hydrogen atom, a metallic atom, and a group having a structure represented by Formula (2) below:

where $R^1$, $R^2$, $R^3$, and $R^4$ independently represent a hydrogen atom or an alkyl group having 1 or 2 carbon atoms that optionally has a hydroxyl group; and

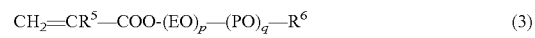

where $R^5$ represents a hydrogen atom or a methyl group, and $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

20. Semiconducting single-walled carbon nanotube-containing ink, comprising:

semiconducting single-walled carbon nanotubes;
at least one of an organic solvent and water; and
a copolymer that includes a structural unit A derived from a monomer represented by Formula (1) below and a structural unit B derived from a monomer represented by Formula (3) below:

where $R^0$ represents a hydrogen atom or a methyl group, and M represents one of a hydrogen atom, a metallic atom, and a group having a structure represented by Formula (2) below:

where $R^1$, $R^2$, $R^3$, and $R^4$ independently represent a hydrogen atom or an alkyl group having 1 or 2 carbon atoms that optionally has a hydroxyl group; and

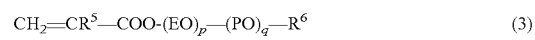

where $R^5$ represents a hydrogen atom or a methyl group, and $R^6$ represents a hydrogen atom or a hydrocarbon group having 1 to 5 carbon atoms, EO represents an ethyleneoxy group, PO represents a propyleneoxy group, p represents the average number of moles of the ethyleneoxy groups added and is 1 or more and 120 or less, and q represents the average number of moles of the propyleneoxy groups added and is 0 or more and 50 or less.

\* \* \* \* \*